United States Patent
Schock et al.

(10) Patent No.: US 10,917,756 B2
(45) Date of Patent: Feb. 9, 2021

(54) IDENTIFICATION VERIFICATION AND AUTHENTICATION SYSTEM

(71) Applicant: Powch, LLC, Lancaster, PA (US)

(72) Inventors: Rosco Schock, Lancaster, PA (US); Essam Abadir, Lancaster, PA (US)

(73) Assignee: Powch, LLC, Lancaster, PA (US)

( * ) Notice: Subject to any disclaimer, the term of this patent is extended or adjusted under 35 U.S.C. 154(b) by 0 days.

(21) Appl. No.: 16/862,690

(22) Filed: Apr. 30, 2020

(65) Prior Publication Data

US 2020/0351619 A1    Nov. 5, 2020

Related U.S. Application Data (60) Provisional application No. 62/841,492, filed on May 1, 2019.

(51) Int. Cl.
| | |
|---|---|
| *G06K 9/62* | (2006.01) |
| *H04L 9/08* | (2006.01) |
| *H04W 4/029* | (2018.01) |
| *H04W 64/00* | (2009.01) |
| *H04B 17/318* | (2015.01) |

(52) U.S. Cl.
CPC .......... *H04W 4/029* (2018.02); *G06K 9/6215* (2013.01); *H04B 17/318* (2015.01); *H04L 9/085* (2013.01); *H04W 64/00* (2013.01)

(58) Field of Classification Search
CPC .... H04W 4/029; H04W 64/00; G06K 9/6215; H04L 9/085; H04B 17/318
See application file for complete search history.

(56) References Cited

U.S. PATENT DOCUMENTS

| | | | |
|---|---|---|---|
| 9,320,067 B2 * | 4/2016 | Ho | H04W 52/383 |
| 10,231,128 B1 | 3/2019 | Ziraknejad et al. | |
| 2013/0066731 A1 | 3/2013 | Finnegan et al. | |
| 2014/0030982 A1 * | 1/2014 | Cardona | G01S 11/06 |
| | | | 455/67.11 |

FOREIGN PATENT DOCUMENTS

| | | |
|---|---|---|
| JP | 2005-123970 A | 5/2005 |
| JP | 2014-127721 A | 7/2014 |

OTHER PUBLICATIONS

International Search Report dated Aug. 7, 2020 for PCT/US2020/030596.
Written Opinion dated Aug. 7, 2020 for PCT/US2020/030596.

* cited by examiner

*Primary Examiner* — Joseph E Dean, Jr.
(74) *Attorney, Agent, or Firm* — Fox Rothschild LLP (57) ABSTRACT

A system for verifying an identity of a user includes a first client electronic device associated with a first user, and a computer-readable storage medium having one or more programming instructions that, when executed, cause the first client electronic device to receive a first secret and a second secret, detect, a wireless signal being broadcast by a second client electronic device in proximity to a specified physical location where the interaction is to occur, establish a communication channel with the second client electronic device, send the first secret to the second client electronic device via the communication channel, receive data from the second client electronic device via the communication channel, determine whether the received data matches the second secret, and in response to determining that the received data matches the second secret, cause an alert to be provided to the first user via the first client electronic device.

16 Claims, 6 Drawing Sheets

IDENTIFICATION VERIFICATION AND AUTHENTICATION SYSTEM

RELATED APPLICATIONS AND CLAIM OF PRIORITY

This patent document claims priority to U.S. Patent Application No. 62/841,492, filed May 1, 2019, the disclosure of which is fully incorporated into this document by reference.

BACKGROUND

Increasingly, today's world is moving to an on-demand or gig economy. As part of this transition, it is becoming normal for strangers to arrange to meet at a specific time and place for a common purpose or transaction. For example, strangers may arrange to meet for a date or other social interaction, to make a delivery, for ride services and/or the like. Software applications have made arranging such meetings quick and easy.

However, despite the commonality, the element of stranger danger is still present in these interactions. The companies providing the platforms that play match-maker for these parties do their best to vet the people that are providing these services, but inevitably some bad actors will slip through the cracks. Also, some of these contractors of the platform company might permit non-vetted parties to perform in their place. For instance, a ride-share driver may lend out his or her vehicle to a non-vetted party unbeknownst to riders or the service making the match. Even more concerning is the expectation that putting a logo on a car or clothes may easily trick an unsuspecting user into interacting with someone who was never vetted in the first place.

While some services provide information pertaining to one or more parties before the meeting, such as a picture, a name or a license plate, this information is sometimes not sufficient to adequately identify a person at the time of the meeting. Likewise, some services show a GPS location of a contractor on a map of an application. However, GPS doesn't work inside a building, and constantly updating a position only works with a strong internet connection.

As such, there is a need to securely determine that an interaction is with the right stranger in a way that is restricted to physical location and that works even without an internet connection or access to reliable GPS locations.

SUMMARY

In an embodiment, a system for verifying an identity of a user includes a first client electronic device associated with a first user, and a computer-readable storage medium having one or more programming instructions that, when executed, cause the first client electronic device to receive, from a provider electronic device, a first secret and a second secret, detect, by a receiver of the first client electronic device, a wireless signal being broadcast by a second client electronic device in proximity to a specified physical location where the interaction is to occur, establish a communication channel with the second client electronic device, send the first secret to the second client electronic device via the communication channel, receive data from the second client electronic device via the communication channel, determine whether the received data matches the second secret, and in response to determining that the received data matches the second secret, cause an alert to be provided to the first user via the first client electronic device. The provider electronic device is associated with a service provider that has matched the first user and a second user for an interaction. The second client electronic device is associated with the second user.

The system may identify a received signal strength indicator included in the wireless signal, and determine whether the second client electronic device is within a threshold distance from the first client electronic device. The system may establish the communication channel with the second client electronic device in response to determining that the second client electronic device is within the threshold distance.

The system may receive input from the first user, and in response to receiving input from the first user, cause the receiver to listen for the wireless signal.

The system may detect the wireless signal being broadcast by the second client electronic device by receiving, from the provider electronic device, a notification that the second user is in proximity to the specified physical location, and in response to receiving the notification, cause the receiver to listen for the wireless signal.

The system may receive data from the second client electronic device via the communication channel by receiving signed data, and obtaining the received data from the received signed data using a public key associated with the second client electronic device.

The system may sign the first secret using a private key associated with the first client electronic device to generate a signed secret, and send the signed secret to the second client electronic device.

The system may include a second computer-readable storage medium having one or more programming instructions that, when executed, cause the second client electronic device to receive the signed secret, obtain the first secret from the signed secret using a public key associated with the first client electronic device, determine whether data received by the second client electronic device from the service provider matches the first secret, and in response to determining that the data received by the second client electronic device from the service provider matches the first secret, cause an alert to be provided to the second user via the second client electronic device.

The system may include a second computer-readable storage medium having one or more programming instructions that, when executed, cause the second client electronic device to receive the first secret, determine whether data received by the second client electronic device from the service provider matches the first secret, and in response to determining that the data received by the second client electronic device from the service provider matches the first secret, cause an alert to be provided to the second user via the second client electronic device.

In an embodiment, a system for verifying an identity of a user includes a first client electronic device that is associated with a first user, and a computer-readable storage medium having one or more programming instructions that, when executed, cause the first client electronic device to receive, from a provider electronic device, a first secret and a second secret, broadcast, by a transmitter of the first client electronic device, a signal unique to the first client electronic device when the first client electronic device is in proximity to a specified physical location where the interaction is to occur, detect a connection that a second client electronic device establishes with the first client electronic device, send the first secret to the second client electronic device, receive, by a receiver of the first client electronic device, data from the second client electronic device, determine whether the received data matches the second secret, and in response to determining that the received data matches the second secret, cause an alert to be provided to the first user via the first client electronic device. The provider electronic device is associated with a service provider that has matched the first user with a second user for an interaction. The second client electronic device is associated with the second user.

The system may broadcast a signal unique to the first client electronic device when the first client electronic device is in proximity to a specified physical location where the interaction is to occur by determining that the first client electronic device is in proximity to the specified physical location, and in response to determining that the first client electronic device is in proximity to the specified physical location, automatically broadcasting the signal.

The system may broadcast a signal unique to the first client electronic device when the first client electronic device is in proximity to a specified physical location where the interaction is to occur by receiving input from the first user, and in response to receiving input from the first user, automatically broadcasting the signal.

The signal may include a received signal strength indicator associated with the first client electronic device.

The system may receive data from the second client electronic device by receiving signed data, and obtaining the received data from the received signed data using a public key associated with the second client electronic device.

The system may sign the first secret using a private key associated with the first client electronic device to generate a signed secret, and send the signed secret to the second client electronic device.

The system may include a second computer-readable storage medium having one or more programming instructions that, when executed, cause the second client electronic device to receive the signed secret, obtain the first secret from the signed secret using a public key associated with the first client electronic device, determine whether data received by the second electronic device from the service provider matches the first secret, and in response to determining that the data received by the second electronic device from the service provider matches the first secret, cause an alert to be provided to the second user via the second client electronic device.

In an embodiment, a system for verifying an identity of a user includes a first client electronic device associated with a first user, and a computer-readable storage medium having one or more programming instructions that, when executed, cause the first client electronic device to detect, by a receiver of the first client electronic device, a wireless signal being broadcast by a second client electronic device in proximity to a specified physical location where an interaction is to occur, detect a received signal strength indicator from the detected wireless signal, send the received signal strength indicator to a provider electronic device associated with a service provider, receive a notification from the provider electronic device indicating that the first client electronic device is within a threshold distance from the second electronic device, and in response to receiving the notification, cause an alert to be provided to the first user via the first client electronic device. The second client electronic device is associated with the second user, and a service provider has matched the first user and the second user for the interaction.

The system may include a second computer-readable storage medium having one or more programming instructions that, when executed, cause the second client electronic device to receive a second notification from the provider electronic device indicating that the first client electronic device is within the threshold distance from the second client electronic device, and in response to receiving the second notification, cause an alert to be provided to the second user via the second client electronic device.

In an embodiment, a system for verifying an identity of a user includes a provider electronic device, and a computer-readable storage medium having one or more programming instructions that, when executed, cause the provider electronic device to receive from a first client electronic device, a received signal strength indicator indicating a proximity of the first client electronic device to a second client electronic device in proximity to a specified physical location, compare the received signal strength indicator to a threshold distance value to determine whether the first client electronic device and the second client electronic device are within the threshold distance from one another, and in response to determining that the first client electronic device and the second client electronic device are within the threshold distance from one another, send a notification to the first client electronic device, the second client electronic device, or both the first client electronic device and the second client electronic device. The first client electronic device is associated with a first user. The second client electronic device is associated with a second user. A service provider associated with the provider electronic device has matched the first user and the second user for an interaction at the specified physical location.

The system may include a second computer-readable storage medium having one or more programming instructions that, when executed, cause the first client electronic device to receive the notification, and cause an alert to be provided to the first user via the first client electronic device.

The system may include a second computer-readable storage medium having one or more programming instructions that, when executed, cause the second client electronic device to receive the notification, and cause an alert to be provided to the second user via the second client electronic device.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players, wearable devices and the like. Various elements of an example of a computing device or processor are described below in reference to FIG. 4.

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

A "secret" refers to data that is to be protected and shared only with authorized parties. For instance, a secret may be information known only to parties of a communication so that any party's possession of the data or a portion of the data can be used to authenticate a party's identity. Examples of secrets may include, without limitation, private encryption keys, private signing keys, bitcoin keys, passwords, biometrics, and/or the like.

A "user account" refers to an account of a user with a provider, such as a service provider, through which the user can access or is provided with access to software, services and/or the like. A user account may be accessed via one or more authentication credentials such as a login, a password, a biometric, a security token and/or the like.

The present disclosure relates generally to identify verification authentication systems. Specifically, this disclosure describes methods and systems that allow a user to meet or interact with a stranger where such interaction is mediated through a centralized platform. As used in this disclosure, a stranger refers to an individual whose identity is to be verified by another. In various embodiments, a stranger may be another system user, a service representative, and/or the like.

In certain situations, for example food delivery, a stranger may be someone who is unknown to a user. In other situations, a user may have some information about a stranger's identity such as, for example, a picture, a physical description, a name, a license plate, and/or the like. For instance, a user and a stranger may both be online dating service subscribers who are matched for a date, and have profile information and one or more pictures of the other. In other situations, a user may have other familiarity or acquaintance with a stranger, but may still have a desire to verify his or her identity.

In various embodiments, a user may have a user account with one or more providers. A user may use a user account to access software, services and/or the like of the provider. Example user accounts may include, without limitation, an online dating service account, a food ordering/delivery service account, a ride sharing account, a contracting service account, a child care service account, an online marketplace account, and/or the like.

A user may access his or her account via an application installed on a client electronic device of the user. A "client electronic device" or "client device" refers to an electronic device associated with a user, such as, for example, a smartphone, a tablet, a wearable device and/or the like.

In various embodiments, a stranger interaction may be between a user (Stranger 1) and a representative of a provider (Stranger 2). For example, a user may be a customer, and a representative may be a driver working on behalf of a ride sharing service provider. As another example, a user may be a customer, and a representative may be a delivery person working on behalf of an ordering/delivery service. Additional and/or alternate types of roles, responsibilities and/or relationships are contemplated within the disclosure.

In other embodiments, a stranger interaction may occur between two users of a provider. For instance, a provider may match two of its users for a particular purpose. For instance, an online dating service may match two of its users (Stranger 1 and Stranger 2) for a date. As another example, a provider may match two users to buy, sell or trade merchandise.

Figure 1:
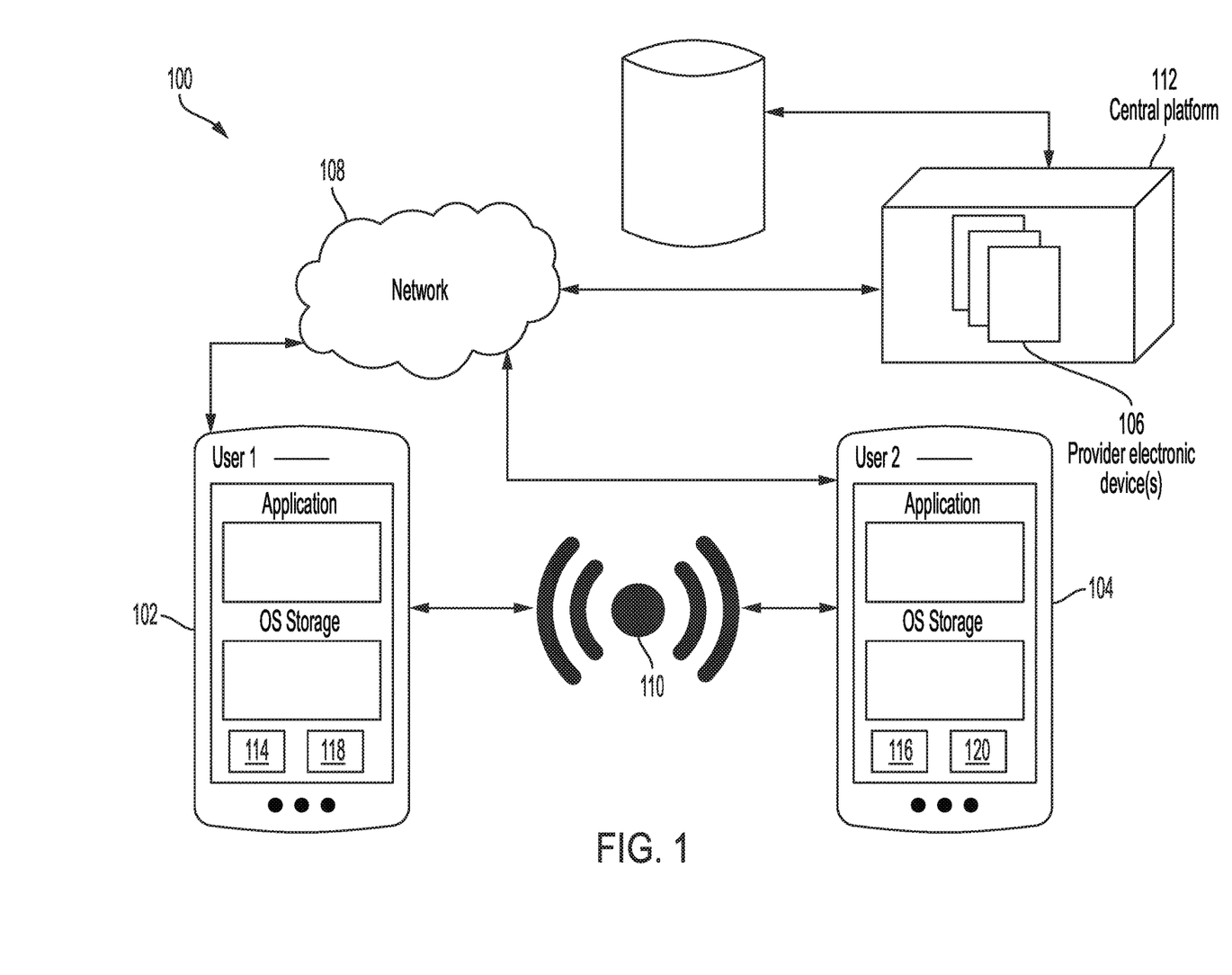
FIG. 1 illustrates an example system for securing data according to an embodiment.

FIG. 1 illustrates an example system for confirming the identity of a stranger according to an embodiment. As illustrated by FIG. 1, the system 100 may include a first client electronic device 102, a second client electronic device 104, and one or more provider electronic devices 106. The first client electronic device 102 may be associated with a first stranger, and a second client electronic device 104 may be associated with a second stranger. The first client electronic device 102 and/or the second electronic device 104 may be in communication with the provider electronic device(s) 106 via a communication network 108.

In an embodiment, a provider electronic device 106 may be an electronic device associated with a provider that is responsible for facilitating a stranger interaction, such as, for example, an online dating service, a ride sharing service, an online marketplace and/or the like. For instance, as illustrated in FIG. 1, one or more provider electronic devices 106 may be part of a central platform 112 associated with a service provider. A central platform 112 may include one or more data stores that may store information pertinent to the service and/or arranged interactions.

Examples of a provider electronic device 106 may include without limitation, a laptop computer, a desktop computer, a tablet, a mobile device, a server, a mainframe or other computing or electronic device.

A communication network 108 may be a local area network (LAN), a wide area network (WAN), a mobile or cellular communication network, an extranet, an intranet, the Internet, a short range communication network and/or the like. Although FIG. 1 shows a single communication network 108 it is to be understood that the network may be implemented as multiple communication networks.

In various embodiments, a first client electronic device 102 may communicate with a second client electronic device 104, and vice versa, via a communication network 110. Although FIG. 1 shows two client electronic devices 102, 104 in communication, it is understood that additional and/or alternate client electronic devices may be used within the scope of this disclosure.

In various embodiments, a first client electronic device 102 and a second client electronic device 104 may communicate with one another via short range communication such as, for example, near field communication (NFC), radio frequency identification (RFID), Bluetooth and/or the like. One or more client electronic devices 102, 104 may include a short range communication receiver 114, 116 and/or transmitter 118, 120 such as, an RFID tag, a Bluetooth antenna, an NFC chip and/or the like. In certain embodiments, a client electronic device 102, 104 may communicate with one or more other client electronic devices 102, 104 via a communication network 110, which may be an authenticated and secure communication channel.

Figure 2A:
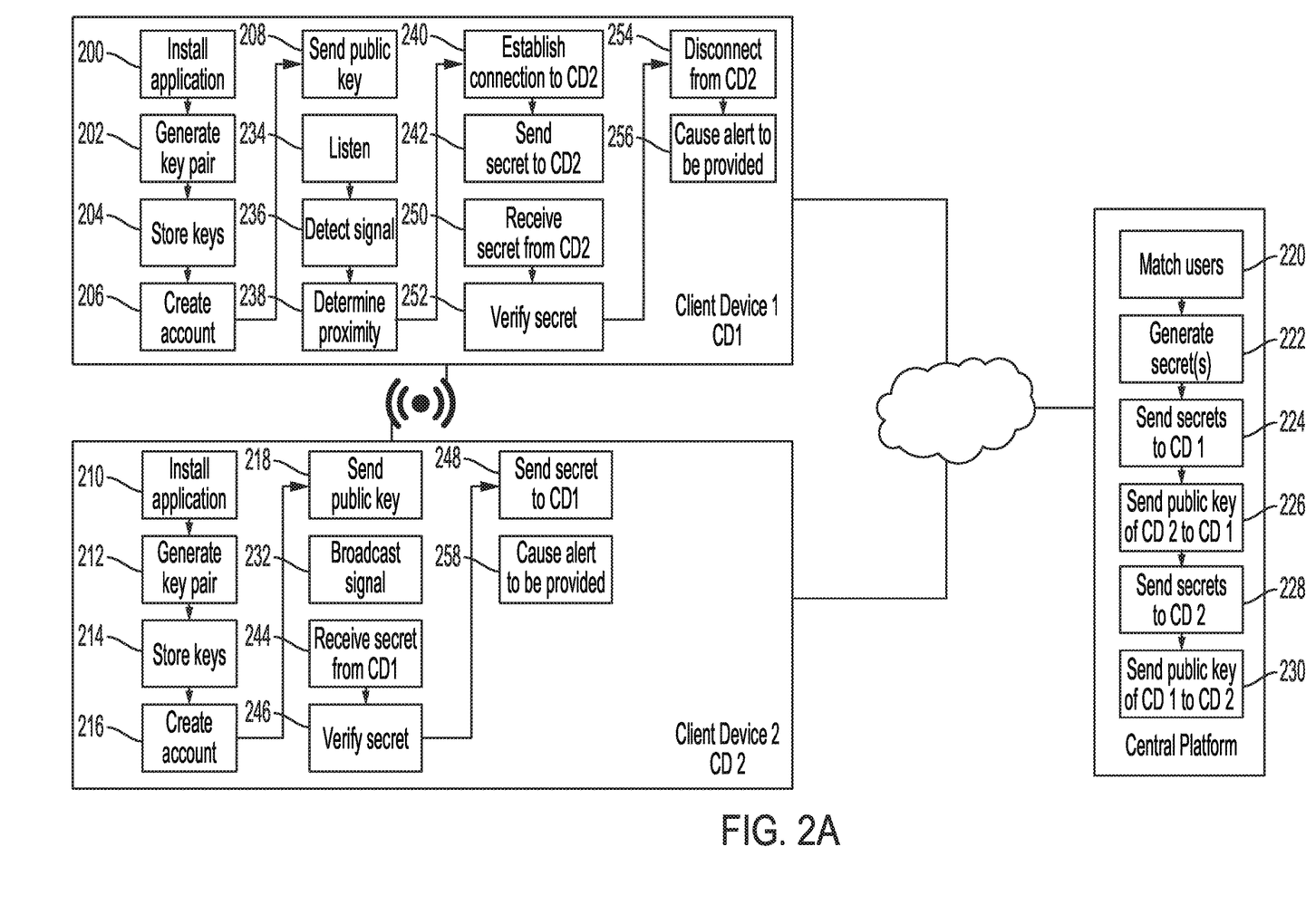
FIG. 2A illustrates a flow chart of an example method of identifying a user according to an embodiment.

FIG. 2A illustrates an example method of identifying a user according to an embodiment. As illustrated, in FIG. 2A, a first user (User 1) may install 200 an application on User 1's client electronic device (Client Device 1). For example, User 1 may download and install 200 an application associated with a central platform of a service provider.

User 1 may be a subscriber, customer, client or other end user of a service associated with the central platform and/or service provider. A central platform may include one or more provider electronic devices that may host software and/or services associated with the installed application.

Once installed, Client Device 1 may generate 202 a strong public private key pair (PK1, SK1) associated with User 1. For instance, Client Device 1 may generate 202 a 256-bit public key and a 256-bit private key according to an embodiment. It is understood that other types of private and public keys may be used within the scope of this disclosure.

Client Device 1 may store 204 the private and public keys to a data store such as, for example, operation system storage of Client Device 1. In various embodiments, User 1 may create 206 an account with a central platform. As part of the creation, the central platform may generate a unique identifier associated with User 1, Client Device 1 and/or the like. In an embodiment, Client Device 1 may send 208 its public key to the central platform. The central platform may store the received public key such that it is associated with the unique identifier of User 1 and/or Client Device 1.

As illustrated by FIG. 2A, a User 2 may install 210 an application on his or her client electronic device (Client Device 2). In an embodiment, User 2 may be a subscriber, customer, client or other end user of a service associated with the central platform and/or service provider. In another embodiment, User 2 may be a contractor or other representative of the service provider such as, for example, a ride-share driver, a delivery person, a contractor and/or the like.

The application that User 2 installs 210 may be the same or similar application that User 1 installs. Alternatively, User 2 may install 210 an application that is different from the one that User 1 installs, but that corresponds to the central platform. Client Device 2 may generate 212 a strong public private key pair (PK2, SK2) associated with User 2. For instance, Client Device 2 may generate 212 a 256-bit public key and a 256-bit private key according to an embodiment. It is understood that other types of private and public keys may be used within the scope of this disclosure.

Client Device 2 may store 214 the private and public keys to a data store such as, for example, operation system storage. In various embodiments, User 2 may create 216 an account with a central platform. As part of the creation, the central platform may generate a unique identifier associated with User 2, Client Device 2 and/or the like. In an embodiment, Client Device 2 may send 218 its public key to the central platform. The central platform may store the received public key such that it is associated with the unique identifier of User 2 and/or Client Device 2.

As shown in FIG. 2A, the central platform may match 220 User 1 and User 2 for a transaction or interaction. For example, the central platform may match 220 User 1 and User 2 in response to User 1 requesting a transaction or interaction be arranged by the central platform with a stranger at a specified location.

For instance, if the central platform is associated with a ride-sharing company, the central platform may match a rider (User 1) with a driver (User 2). As another example, if the central platform is associated with a dating service, the central platform may match a first user (User 1) with a second user (User 2). As yet another example, if the central platform is associated with a home repair service, the central platform may match a resident (e.g., a home owner, renter, etc.) (User 1) with a repair technician (User 2). Additional and/or alternate relationships and/or matches may be used within the scope of this disclosure.

Once a match is made, the central platform may generate 222 one or more secret values. For example, the central platform may generate 222 a first secret (S1), and a second secret (S2). The secret values may be different from one another, or they may be the same. The secret values may be valid for the interaction between User 1 and User 2 only. In various embodiments, the secret values may be randomly or pseudo-randomly generated values.

The central platform may send 224 the two secret values (S1, S2) to Client Device 1. Optionally, the central platform may also send 226 the public key associated with Client Device 2 and/or User 2 (PK2) to Client Device 1. Similarly, the central platform may send 228 the two secret values (S1, S2) to Client Device 2. Optionally the central platform may also send 230 the public key associated with Client Device 1 and/or User 1 (PK1) to Client Device 2.

In various embodiments, the meeting or interaction that is arranged between User 1 and User 2 may be arranged for a particular time and place. The place may be a specified physical location where User 1 and User 2 are to meet. For instance, if the interaction is a delivery, the specified physical location for the interaction may be User 1's apartment, home or other address. As another example, if the interaction is a ride-share, the specified physical location for the interaction may be a pickup location that User 1 specifies. In various embodiments, the time and specified physical location for an interaction may be mediated by the central platform.

User 1 may arrive (or be present) at the specified physical location with Client Device 1 at or around the time specified for the interaction. User 2 may arrive at the specified physical location with Client Device 2 at or around the time specified for the interaction.

Client Device 2 may broadcast 232 a wireless signal over a wireless channel. For example, Client Device 2 may broadcast 232 a wireless signal over a wireless channel when User 2 arrives at the specified physical location. In an embodiment, a short range communication transmitter of Client Device 2 may broadcast 232 a wireless signal. The wireless signal may be unique to Client Device 2, and may indicate that User 2 has arrived at the specified physical location. In various embodiments, the wireless signal may be encrypted.

Client Device 2 may automatically begin broadcasting 232 a wireless signal when Client Device 2 is at or in proximity to the specified physical location. For instance, Client Device 2 may use GPS or other geolocation technology to determine Client Device 2's position. If such a position is at or within a certain proximity to the specified physical location, Client Device 2 may automatically begin broadcasting 232 a wireless signal.

As another example, Client Device 2 may begin broadcasting 232 a wireless signal in response to receiving input from User 2. For instance, User 2 may press a button, provide a verbal command or otherwise provide input to the application indicating that User 2 has arrived at the specified physical location.

In various embodiments, Client Device 1 may listen 234 for the wireless signal being broadcast by Client Device 2 at the specified physical location. For example, a short range communication receiver may listen 234 for the wireless signal. In various embodiments, Client Device 1 may automatically begin listening 234 for a wireless signal when Client Device 1 is at or in proximity to the specified physical location. For instance, Client Device 1 may use GPS or other geolocation technology to determine Client Device 1's position. If such a position is at or within a certain proximity to the specified physical location, Client Device 1 may automatically begin listening 234 a wireless signal.

In another embodiment, Client Device 1 may begin listening 234 for a wireless signal in response to receiving input from User 1. For instance, User 1 may press a button, provide a verbal command or otherwise provide input to the application when User 1 knows or suspects that User 2 has arrived at the specified physical location. For instance, in a delivery scenario, User 1 may press a button on Client Device 1 when User 2 knocks on User 1's door.

In another embodiment, Client Device 1 may begin listening 234 for a wireless signal in response to receiving a notification that User 2 is at the specified physical location. For instance, the central platform may send a notification to Client Device 1 when Client Device 2 arrives at the specified physical location. For instance, the central platform may determine, via GPS or other geolocation technology, that Client Device 2 is at or near the specified physical location. In response, the central platform may send a notification to Client Device 1, which may cause Client Device 1 to begin listening 234 for the wireless signal being broadcast by Client Device 2.

Client Device 1 may detect 236 Client Device 2's wireless signal. In an embodiment, if the broadcast wireless signal is encrypted, Client Device 1 may decrypt the encrypted wireless signal. The wireless signal being broadcast by Client Device 2 may include or be derived from some combination of S1, S2, PK1 and/or PK2. As such, Client Device 1 may detect the correct wireless signal by determining whether the signal includes or is derived from S1, S2, PK1 and/or PK2.

In various embodiments, Client Device 1 may determine 238 whether Client Device 2 is in close physical proximity to Client Device 1. In various embodiments, close physical proximity may be within a certain threshold distance, for example, two to four feet. Alternate distances may be used within the scope of this disclosure. For instance, Client Device 1 may detect a received signal strength indicator (RSSI) from the wireless signal being broadcast by Client Device 2. Based, on the RSSI, Client Device 1 may determine whether Client Device 1 is within a threshold distance from Client Device 2.

In response to determining that Client Device 2 is in close physical proximity to Client Device 1, Client Device 1 may establish 240 a connection to Client Device 2 over a wireless channel. In other embodiments, Client Device 1 may not determine a proximity to Client Device 2, but instead may establish 240 a connection to Client Device 2 when Client Device 1 detects Client Device 2's broadcast signal.

Client Device 1 may send 242 one of the secrets (e.g., S1) to Client Device 2 over the wireless channel. In various embodiments, Client Device 1 may sign the secret to generate a cryptographic signature, and may send the cryptographic signature to Client Device 2. For example, Client Device 1 may sign the secret with Client Device 1's private key (SK1) to create a cryptographic signature.

Client Device 2 may receive 244 the secret (or cryptographic signature) via the wireless channel. If Client Device 2 receives 244 a cryptographic signature, it may verify the cryptographic signature to match the secret. For example, Client Device 2 may obtain Client Device 1's public key (PK1) from the central platform, and may use it to verify the cryptographic signature.

Client Device 2 may verify 246 that the received secret matches a secret received from the central platform in step 228. In response to verifying 246 that the received secret matches a secret provided by the central platform, Client Device 2 may send 248 the other secret (e.g., S2) to Client Device 1. In various embodiments, Client Device 2 may sign the secret to generate a cryptographic signature, and may send the cryptographic signature to Client Device 1. For example, Client Device 2 may sign the secret with Client Device 2's private key (SK2) to create a cryptographic signature.

Client Device 1 may receive 250 the secret (or cryptographic signature) via the wireless channel. If Client Device 1 receives a cryptographic signature, it may verify the cryptographic signature to match the secret. For example, Client Device 1 may obtain Client Device 2's public key (PK2) from the central platform, and may use it to verify the cryptographic signature.

Client Device 1 may verify 252 that the received secret matches a secret received from the central platform in step 224. In response to verifying 252 that the received secret matches the secret from the central platform, Client Device 1 may disconnect 254 the connection between Client Device 1 and Client Device 2 over the wireless channel.

In response to Client Device 1 verifying 252 that the received secret matches a secret received from the central platform, Client Device 1 may cause 256 an alert to be provided to User 1 via Client Device 1. The alert may be an indication that User 2 has been verified and is in close physical proximity to User 1 at their specified physical location For instance, Client Device 1 may cause 256 a visual alert or notification (e.g., an alert window) to be displayed to User 1. As another example, Client Device 1 may vibrate a certain number of times. As yet another example, Client Device 1 may generate an audio alert (e.g., a beep, chime or other audio indication).

In response to Client Device 2 verifying 246 that the secret it received from Client Device 1 matches a secret received from the central platform, Client Device 2 may cause 258 an alert to be provided to User 2 via Client Device 2. The alert may be an indication that User 1 has been verified and is in close physical proximity to User 2 at their specified physical location. For instance, Client Device 2 may cause 258 a visual alert or notification (e.g., an alert window) to be displayed to User 2. As another example, Client Device 2 may vibrate a certain number of times. As yet another example, Client Device 2 may generate an audio alert (e.g., a beep, chime or other audio indication).

Figure 2B:
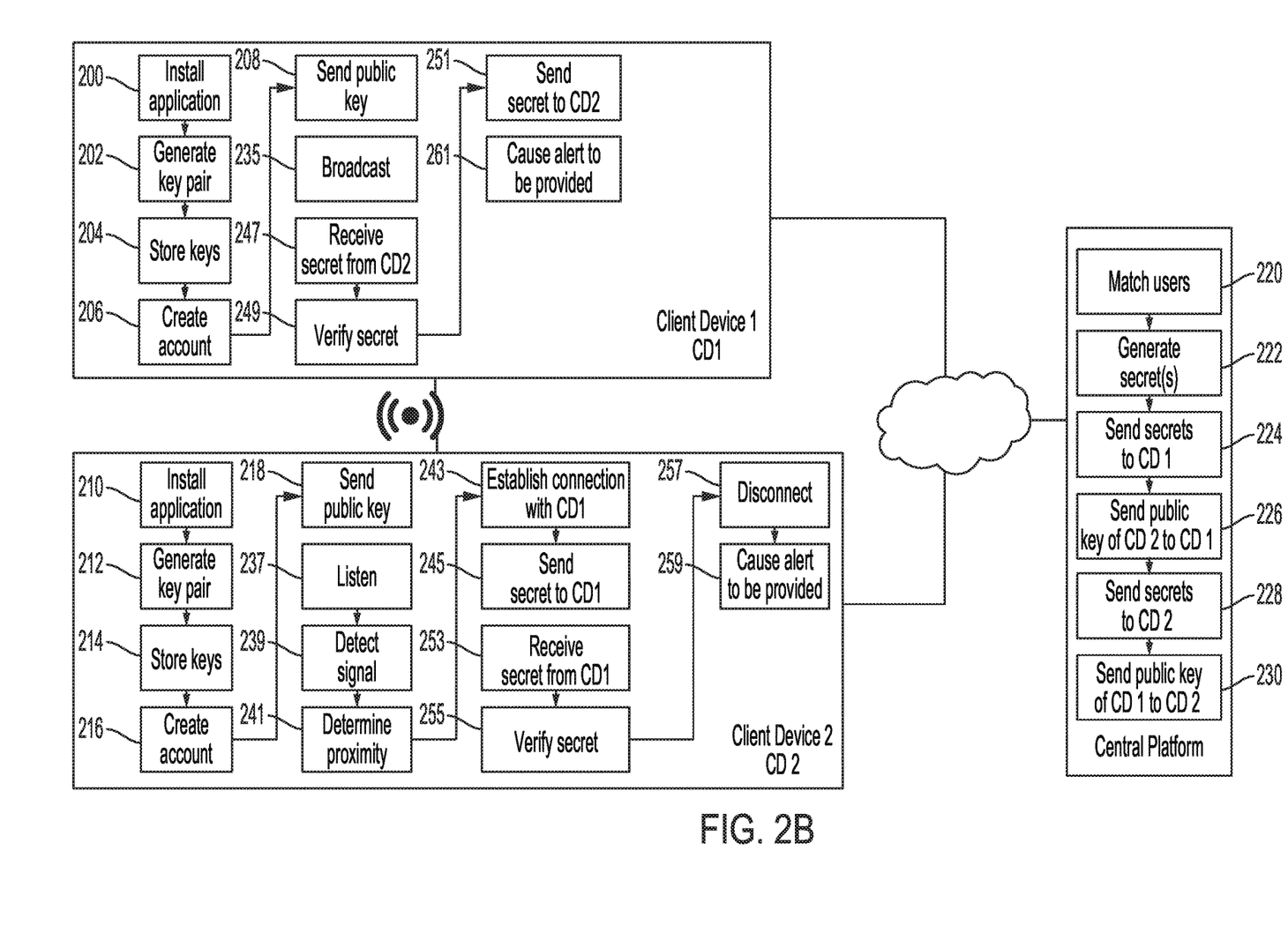
FIG. 2B illustrates a flow chart of an example method of identifying a user according to an embodiment.

FIG. 2B illustrates another example method of identifying a user according to an embodiment. As illustrated, in FIG. 2B, the method shown may be the same as that illustrated in FIG. 2A from steps 200-230.

However, in this embodiment, Client Device 1 may broadcast 235 a wireless signal over a wireless channel. For example, Client Device 1 may broadcast 235 a wireless signal over a wireless channel when User 1 arrives at the specified location. For example, a short range communication transmitter of Client Device 1 may broadcast 235 a wireless signal. The wireless signal may be unique to Client Device 1, and may indicate that User 1 has arrived at the specified physical location. In various embodiments, the wireless signal may be encrypted.

Client Device 1 may automatically begin broadcasting 235 a wireless signal when Client Device 1 is at or in proximity to the specified physical location. For instance, Client Device 1 may use GPS or other geolocation technology to determine Client Device 1's position. If such a position is at or within a certain proximity to the specified physical location, Client Device 1 may automatically begin broadcasting 235 a wireless signal.

As another example, Client Device 1 may begin broadcasting 235 a wireless signal in response to receiving input from User 1. For instance, User 1 may press a button, provide a verbal command or otherwise provide input to the application indicating that User 1 has arrived at the specified physical location.

In various embodiments, Client Device 2 may listen 237 for the wireless signal being broadcast by Client Device 1 at the specified physical location. For example, a short range communication receiver may listen 237 for the wireless signal. In various embodiments, Client Device 2 may automatically begin listening 237 for a wireless signal when Client Device 2 is at or in proximity to the specified physical location. For instance, Client Device 2 may use GPS or other geolocation technology to determine Client Device 2's position. If such a position is at or within a certain proximity to the specified physical location, Client Device 2 may automatically begin listening 237 a wireless signal.

In another embodiment, Client Device 2 may begin listening 237 for a wireless signal in response to receiving input from User 2. For instance, User 2 may press a button, provide a verbal command or otherwise provide input to the application when User 2 knows or suspects that User 1 has arrived at the specified physical location. For instance, in a delivery scenario, User 2 may press a button on Client Device 2 when User 1 knocks on User 2's door.

In another embodiment, Client Device 2 may begin listening 237 for a wireless signal in response to receiving a notification that User 1 is at the specified physical location. For instance, the central platform may send a notification to Client Device 2 when Client Device 1 arrives at the specified physical location. For instance, the central platform may determine, via GPS or other geolocation technology that Client Device 1 is at or near the specified physical location. In response, the central platform may send a notification to Client Device 2, which may cause Client Device 2 to begin listening 237 for the wireless signal being broadcast by Client Device 1.

Client Device 2 may detect 239 Client Device 1's wireless signal. In an embodiment, if the broadcast wireless signal is encrypted, Client Device 2 may decrypt the encrypted wireless signal. The wireless signal being broadcast by Client Device 1 may include or be derived from some combination of S1, S2, PK1 and/or PK2. As such, Client Device 2 may detect the correct wireless signal by determining whether the signal includes or is derived from S1, S2, PK1 and/or PK2.

In various embodiments, Client Device 2 may determine 241 whether Client Device 1 is in close physical proximity to Client Device 2. In various embodiments, close physical proximity may be within a certain threshold distance, for example, two to four feet. Alternate distances may be used within the scope of this disclosure. For instance, Client Device 2 may detect a received signal strength indicator (RSSI) from the wireless signal being broadcast by Client Device 1. Based, on the RSSI, Client Device 2 may determine whether Client Device 2 is within a threshold distance from Client Device 1.

In response to determining that Client Device 1 is in close physical proximity to Client Device 2, Client Device 2 may establish 243 a connection to Client Device 1 over a wireless channel. In other embodiments, Client Device 2 may not determine a proximity to Client Device 1, but instead may establish 243 a connection to Client Device 1 when Client Device 2 detects Client Device 1's broadcast signal.

Client Device 2 may send 245 one of the secrets (e.g., S2) to Client Device 1 over the wireless channel. In various embodiments, Client Device 2 may sign the secret to generate a cryptographic signature, and may send the cryptographic signature to Client Device 1. For example, Client Device 2 may sign the secret with Client Device 2's private key (SK2) to create a cryptographic signature.

Client Device 1 may receive 247 the secret (or cryptographic signature) via the wireless channel. If Client Device 1 receives 247 a cryptographic signature, it may verify the cryptographic signature to match the secret. For example, Client Device 1 may obtain Client Device 2's public key (PK2) from the central platform, and may use it to verify the cryptographic signature.

Client Device 1 may verify 249 that the received secret matches a secret received from the central platform in step 224. In response to verifying 249 that the received secret matches a secret provided by the central platform, Client Device 1 may send 251 the other secret (e.g., S1) to Client Device 2. In various embodiments, Client Device 1 may sign the secret to generate a cryptographic signature, and may send 251 the cryptographic signature to Client Device 2. For example, Client Device 1 may sign the secret with Client Device 1's private key (SK1) to create a cryptographic signature.

Client Device 2 may receive 253 the secret (or cryptographic signature) via the wireless channel. If Client Device 2 receives 253 a cryptographic signature, it may verify the cryptographic signature to match the secret. For example, Client Device 2 may obtain Client Device 1's public key (PK1) from the central platform, and may use it to verify the cryptographic signature.

Client Device 2 may verify 255 that the received secret matches a secret received from the central platform in step 228. In response to verifying 255 that the received secret matches the secret from the central platform, Client Device 2 may disconnect 257 the connection between Client Device 2 and Client Device 1 over the wireless channel.

In response to Client Device 2 verifying 255 that the received secret matches a secret received from the central platform, Client Device 2 may cause 259 an alert to be provided to User 2 via Client Device 2. The alert may be an indication that User 1 has been verified and is in close physical proximity to User 2 at their specified physical location For instance, Client Device 2 may cause 259 a visual alert or notification (e.g., an alert window) to be displayed to User 2. As another example, Client Device 2 may vibrate a certain number of times. As yet another example, Client Device 2 may generate an audio alert (e.g., a beep, chime or other audio indication).

In response to Client Device 1 verifying 249 that the secret it received from Client Device 2 matches a secret received from the central platform, Client Device 1 may cause 261 an alert to be provided to User 1 via Client Device 1. The alert may be an indication that User 2 has been verified and is in close physical proximity to User 1 at their specified physical location. For instance, Client Device 1 may cause 261 a visual alert or notification (e.g., an alert window) to be displayed to User 1. As another example, Client Device 1 may vibrate a certain number of times. As yet another example, Client Device 1 may generate an audio alert (e.g., a beep, chime or other audio indication).

Figure 3A:
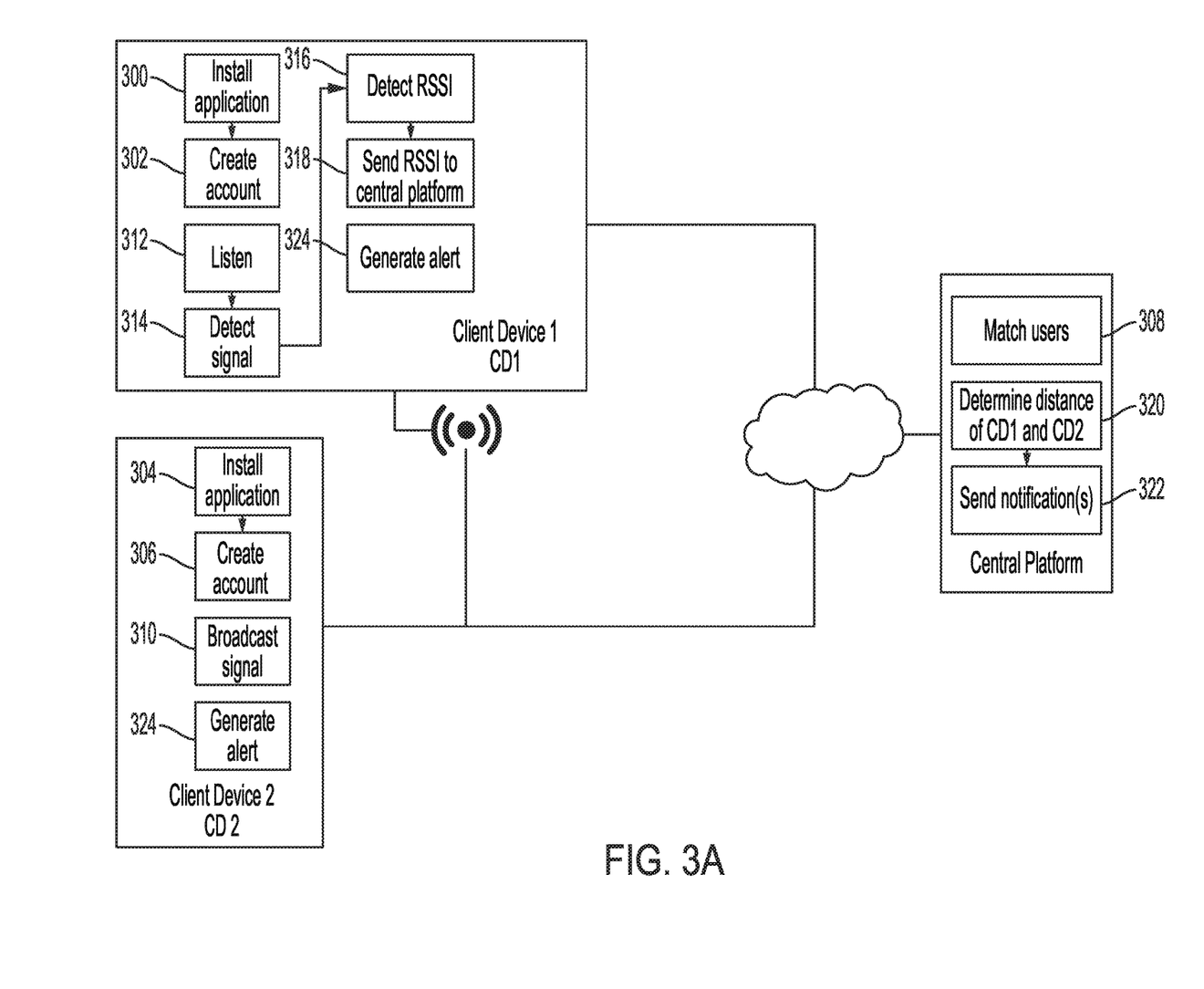
FIG. 3A illustrates a flow chart of an example method of identifying a user according to an embodiment.

FIG. 3A illustrates an example system for confirming the identity of a user according to an embodiment. As illustrated, in FIG. 3A, a first user (User 1) may install 300 an application on User 1's client electronic device (Client Device 1). For example, User 1 may download and install 300 an application associated with a central platform of a service provider.

User 1 may be a subscriber, customer, client or other end user of a service associated with the central platform and/or service provider. A central platform may include one or more provider electronic devices that may host software and/or services associated with the installed application.

In various embodiments, User 1 may create 302 an account with a central platform. As part of the creation, the central platform may generate a unique identifier associated with User 1, Client Device 1 and/or the like.

As illustrated by FIG. 3A, a User 2 may install 304 an application on his or her client electronic device (Client Device 2). In an embodiment, User 2 may be a subscriber, customer, client or other end user of a service associated with the central platform and/or service provider. In another embodiment, User 2 may be a contractor or other representative of the service provider such as, for example, a ride-share driver, a delivery person, a contractor and/or the like.

The application that User 2 installs 304 may be the same or similar application that User 1 installs. Alternatively, User 2 may install 304 an application that is different from the one that User 1 installs, but that corresponds to the central platform.

In various embodiments, User 2 may create 306 an account with a central platform. As part of the creation, the central platform may generate a unique identifier associated with User 2, Client Device 2 and/or the like.

As shown in FIG. 3A, the central platform may match 308 User 1 and User 2 for a transaction or interaction. For example, the central platform may match 308 User 1 and User 2 in response to User 1 requesting a transaction or interaction be arranged by the central platform with a stranger at a specified location.

For instance, if the central platform is associated with a ride-sharing company, the central platform may match a rider (User 1) with a driver (User 2). As another example, if the central platform is associated with a dating service, the central platform may match a first user (User 1) with a second user (User 2). As yet another example, if the central platform is associated with a home repair service, the central platform may match a resident (e.g., a home owner, renter, etc.) (User 1) with a repair technician (User 2). Additional and/or alternate relationships and/or matches may be used within the scope of this disclosure.

In various embodiments, the meeting or interaction that is arranged between User 1 and User 2 may be arranged for a particular time and place. The place may be a specified physical location where User 1 and User 2 are to meet. For instance, if the interaction is a delivery, the specified physical location for the interaction may be User 1's apartment, home or other address. As another example, if the interaction is a ride-share, the specified physical location for the interaction may be a pickup location that User 1 specifies. In various embodiments, the time and specified physical location for an interaction may be mediated by the central platform.

User 1 may arrive (or be present) at the specified physical location with Client Device 1 at or around the time specified for the interaction. User 2 may arrive at the specified physical location with Client Device 2 at or around the time specified for the interaction.

Client Device 2 may broadcast 310 a wireless signal over a wireless channel. For instance, Client Device 2 may broadcast 310 a wireless signal over a wireless channel when User 2 arrives at the specified physical location. A short range communication transmitter of Client Device 2 may broadcast 310 a wireless signal. The wireless signal may be unique to Client Device 2, and may indicate that User 2 has arrived at the specified physical location. In various embodiments, the wireless signal may be encrypted.

Client Device 2 may automatically begin broadcasting 310 a wireless signal when Client Device 2 is at or in proximity to the specified physical location. For instance, Client Device 2 may use GPS or other geolocation technology to determine Client Device 2's position. If such a position is at or within a certain proximity to the specified physical location, Client Device 2 may automatically begin broadcasting 310 a wireless signal.

As another example, Client Device 2 may begin broadcasting 310 a wireless signal in response to receiving input from User 2. For instance, User 2 may press a button, provide a verbal command or otherwise provide input to the application indicating that User 2 has arrived at the specified physical location.

In various embodiments, Client Device 1 may listen 312 for the wireless signal being broadcast by Client Device 2 at the specified physical location. For example, a short range communication receiver may listen 312 for the wireless signal. In various embodiments, Client Device 1 may automatically begin listening 312 for a wireless signal when Client Device 1 is at or in proximity to the specified physical location. For instance, Client Device 1 may use GPS or other geolocation technology to determine Client Device 1's position. If such a position is at or within a certain proximity to the specified physical location, Client Device 1 may automatically begin listening 312 a wireless signal.

In another embodiment, Client Device 1 may begin listening 312 for a wireless signal in response to receiving input from User 1. For instance, User 1 may press a button, provide a verbal command or otherwise provide input to the application when User 1 knows or suspects that User 2 has arrived at the specified physical location. For instance, in a delivery scenario, User 1 may press a button on Client Device 1 when User 2 knocks on User 1's door.

In another embodiment, Client Device 1 may begin listening 312 for a wireless signal in response to receiving a notification that User 2 is at the specified physical location. For instance, the central platform may send a notification to Client Device 1 when Client Device 2 arrives at the specified physical location. For instance, the central platform may determine, via GPS or other geolocation technology, that Client Device 2 is at or near the specified physical location. In response, the central platform may send a notification to Client Device 1, which may cause Client Device 1 to begin listening 312 for the wireless signal being broadcast by Client Device 2.

Client Device 1 may detect 314 Client Device 2's wireless signal. In an embodiment, if the broadcast wireless signal is encrypted, Client Device 1 may decrypt the encrypted wireless signal. The wireless signal being broadcast by Client Device 2 may include or be derived from the unique user identifiers created by the central platform as part of the account creation process, for example, as described with respect to steps 302 and/or 306. In another embodiment, the wireless signal being broadcast by Client Device 2 may include or be derived from another identifier derived and/or randomly or pseudo-randomly generated by the central platform and shared with Client Device 1 and Client Device 2 as part of the arranged meeting or interaction. As such, Client Device 1 may detect the correct wireless signal by determining whether the signal includes or is derived from the shared unique identifier as specified by the central platform.

In various embodiments, Client Device 1 may detect 316 a received signal strength indicator (RSSI) from the wireless signal being broadcast by Client Device 2. The RSSI may be indicative of a proximity of Client Device 1 to Client Device 2. Client Device 1 may send 318 the RSSI to the central platform. The central platform may determine 320 whether, based on the RSSI, Client Device 1 is within a threshold distance from Client Device 2. If the central platform determines 320 that Client Device 1 is not within a threshold distance from Client Device 2, the central platform may send a notification to Client Device 1. Client Device 1 may continue to detect 316 RSSI and send 318 the RSSI to the central platform until the central platform determines 320 that Client Device 1 is within a threshold distance from Client Device 2.

If the central platform determines 320 that Client Device 1 and Client Device 2 are within a threshold distance from one another, the central platform may send 322 a notification to Client Device 1 and/or to Client Device 2. The notification may cause Client Device 1 and/or Client Device 2 to generate 324 an alert to be provided to User 1 and User 2, respectively. The alert may be an indication that User 1 and User 2 have been verified and are in close physical proximity to one another at their specified physical location. For instance, Client Device 1 and/or Client Device 2 may cause 324 a visual alert or notification (e.g., an alert window) to be displayed to its user. As another example, Client Device 1 and/or Client Device 2 may vibrate a certain number of times. As yet another example, Client Device 1 and/or Client Device 2 may generate an audio alert (e.g., a beep, chime or other audio indication).

Figure 3B:
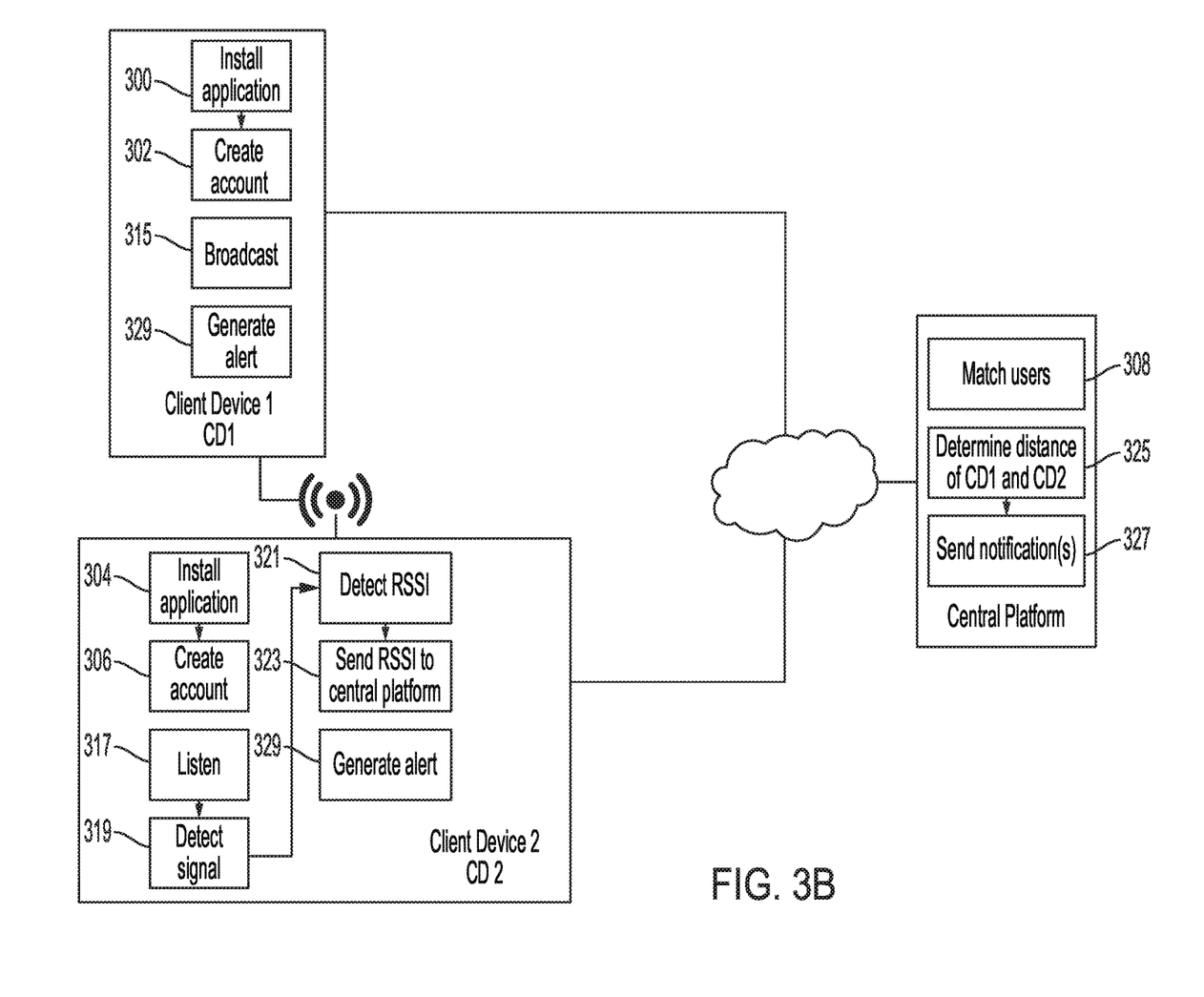
FIG. 3B illustrates a flow chart of an example method of identifying a user according to an embodiment.

As illustrated, in FIG. 3B, the method shown may be the same as that illustrated in FIG. 3A from steps 300-310.

However, in this embodiment, Client Device 1 may broadcast 315 a wireless signal over a wireless channel. For example, Client Device 1 may broadcast 315 a wireless signal over a wireless channel when User 1 arrives at the specified location. For example, a short range communication transmitter of Client Device 1 may broadcast 315 a wireless signal. The wireless signal may be unique to Client Device 1, and may indicate that User 1 has arrived at the specified physical location. In various embodiments, the wireless signal may be encrypted.

Client Device 1 may automatically begin broadcasting 315 a wireless signal when Client Device 1 is at or in proximity to the specified physical location. For instance, Client Device 1 may use GPS or other geolocation technology to determine Client Device 1's position. If such a position is at or within a certain proximity to the specified physical location, Client Device 1 may automatically begin broadcasting 315 a wireless signal.

As another example, Client Device 1 may begin broadcasting 315 a wireless signal in response to receiving input from User 1. For instance, User 1 may press a button, provide a verbal command or otherwise provide input to the application indicating that User 1 has arrived at the specified physical location.

In various embodiments, Client Device 2 may listen 317 for the wireless signal being broadcast by Client Device 1 at the specified physical location. For example, a short range communication receiver may listen 317 for the wireless signal. In various embodiments, Client Device 2 may automatically begin listening 317 for a wireless signal when Client Device 2 is at or in proximity to the specified physical location. For instance, Client Device 2 may use GPS or other geolocation technology to determine Client Device 2's position. If such a position is at or within a certain proximity to the specified physical location, Client Device 2 may automatically begin listening 317 a wireless signal.

In another embodiment, Client Device 2 may begin listening 317 for a wireless signal in response to receiving input from User 2. For instance, User 2 may press a button, provide a verbal command or otherwise provide input to the application when User 2 knows or suspects that User 1 has arrived at the specified physical location. For instance, in a delivery scenario, User 2 may press a button on Client Device 2 when User 1 knocks on User 2's door.

In another embodiment, Client Device 2 may begin listening 317 for a wireless signal in response to receiving a notification that User 1 is at the specified physical location. For instance, the central platform may send a notification to Client Device 2 when Client Device 1 arrives at the specified physical location. For instance, the central platform may determine, via GPS or other geolocation technology, that Client Device 1 is at or near the specified physical location. In response, the central platform may send a notification to Client Device 2, which may cause Client Device 2 to begin listening 317 for the wireless signal being broadcast by Client Device 1.

Client Device 2 may detect 319 Client Device 1's wireless signal. In an embodiment, if the broadcast wireless signal is encrypted, Client Device 2 may decrypt the encrypted wireless signal. The wireless signal being broadcast by Client Device 1 may include or be derived from the unique user identifiers created by the central platform in steps 302 and/or 306. In another embodiment, the wireless signal being broadcast by Client Device 1 may include or be derived from another identifier derived and/or randomly or pseudo-randomly generated by the central platform and shared with Client Device 1 and Client Device 2 as part of the arranged meeting or interaction. As such, Client Device 2 may detect 319 the correct wireless signal by determining whether the signal includes or is derived from the shared unique identifier as specified by the central platform.

In various embodiments, Client Device 2 may detect 321 a received signal strength indicator (RSSI) from the wireless signal being broadcast by Client Device 1. The RSSI may be indicative of a proximity of Client Device 1 to Client Device 2. Client Device 2 may send 323 the RSSI to the central platform. The central platform may determine 325 whether, based on the RSSI, Client Device 1 is within a threshold distance from Client Device 2. If the central platform determines 323 that Client Device 1 is not within a threshold distance from Client Device 2, the central platform may send a notification to Client Device 2. Client Device 2 may continue to detect 321 RSSI and send 323 the RSSI to the central platform until the central platform determines 325 that Client Device 1 is within a threshold distance from Client Device 2.

If the central platform determines 325 that Client Device 1 and Client Device 2 are within a threshold distance from one another, the central platform may send 327 a notification to Client Device 1 and/or to Client Device 2. The notification may cause 329 Client Device 1 and/or Client Device 2 to generate an alert to be provided to User 1 and User 2, respectively. The alert may be an indication that User 1 and User 2 have been verified and are in close physical proximity to one another at their specified physical location. For instance, Client Device 1 and/or Client Device 2 may cause 329 a visual alert or notification (e.g., an alert window) to be displayed to its user. As another example, Client Device 1 and/or Client Device 2 may vibrate a certain number of times. As yet another example, Client Device 1 and/or Client Device 2 may generate an audio alert (e.g., a beep, chime or other audio indication).

Figure 4:
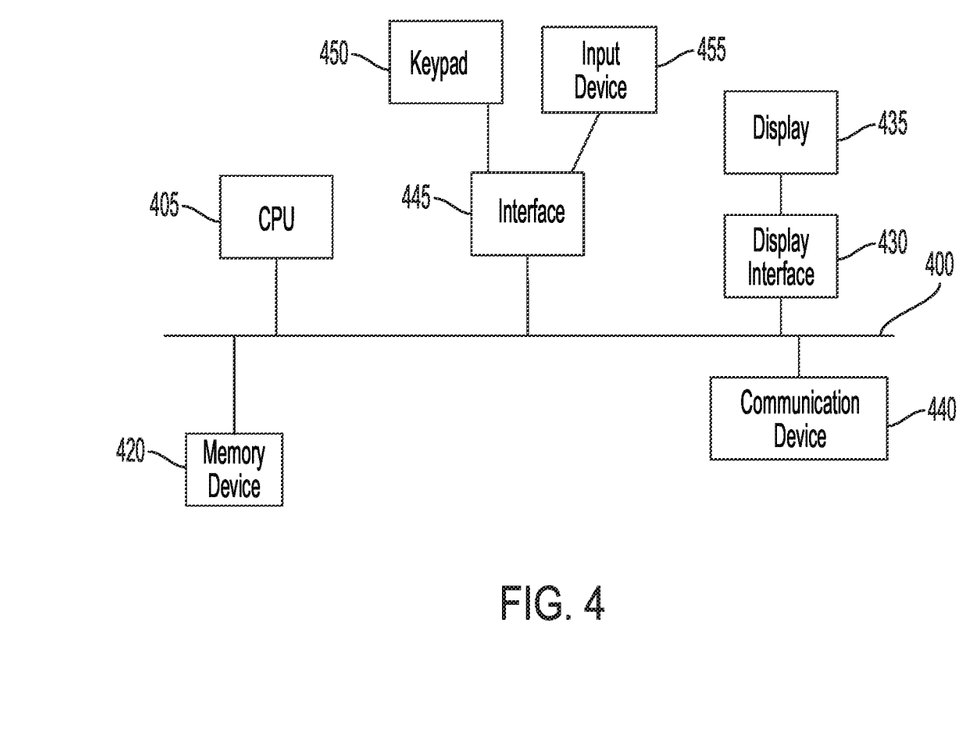
FIG. 4 illustrates a block diagram of example hardware that may be used to contain or implement program instructions according to an embodiment.

FIG. 4 depicts a block diagram of an example of internal hardware that may be used to contain or implement program instructions, such as the process steps discussed above, according to embodiments. A bus 400 serves as an information highway interconnecting the other illustrated components of the hardware. CPU 405 represents one or more processors of the system, performing calculations and logic operations required to execute a program. CPU 405, alone or in conjunction with one or more of the other elements disclosed in FIG. 4, is an example of a processing device, computing device or processor as such terms are used within this disclosure. Memory devices (or processor-readable storage media) 420 may include, for example read only memory (ROM), random access memory (RAM), an external or internal disk drive, a hard drive, flash memory, a USB drive or the like. As indicated previously, these various drives and controllers are optional devices.

Program instructions, software or interactive modules for providing the interface and performing any querying or analysis associated with one or more data sets may be stored in one or more memory devices 420.

An optional display interface 430 may permit information from the bus 400 to be displayed on the display 435 in audio, visual, graphic or alphanumeric format. Communication with external devices, such as a print device, may occur using various communication ports 440. A communication port 440 may be attached to a communications network, such as the Internet or an intranet. In various embodiments, an optional transmitter and/or receiver may permit the sending and receiving of information to and from other device, respectively.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of verifying an identity of a user, the method comprising:
by a first client electronic device associated with a first user:
receiving, from a provider electronic device, a first secret and a second secret, wherein the provider electronic device is associated with a service provider that has matched the first user and a second user for an interaction,
detecting, by a receiver of the first client electronic device, a wireless signal being broadcast by a second client electronic device in proximity to a specified physical location where the interaction is to occur, wherein the second client electronic device is associated with the second user,
establishing a communication channel with the second client electronic device,
sending the first secret to the second client electronic device via the communication channel,
receiving data from the second client electronic device via the communication channel,
determining whether the received data matches the second secret, and
in response to determining that the received data matches the second secret, causing an alert to be provided to the first user via the first client electronic device.

2. The method of claim 1, further comprising:
identifying a received signal strength indicator included in the wireless signal; and
determining whether the second client electronic device is within a threshold distance from the first client electronic device,
wherein establishing the communication channel with the second client electronic device comprises establishing the communication channel with the second client electronic device in response to determining that the second client electronic device is within the threshold distance.

3. The method of claim 1, wherein detecting the wireless signal being broadcast by the second client electronic device comprises:
receiving input from the first user; and
in response to receiving input from the first user, causing the receiver to listen for the wireless signal.

4. The method of claim 1, wherein detecting the wireless signal being broadcast by the second client electronic device comprises:
receiving, from the provider electronic device, a notification that the second user is in proximity to the specified physical location; and
in response to receiving the notification, causing the receiver to listen for the wireless signal.

5. The method of claim 1, wherein receiving data from the second client electronic device via the communication channel comprises:
receiving signed data; and
obtaining the received data from the received signed data using a public key associated with the second client electronic device.

6. The method of claim 1, further comprising:
signing the first secret using a private key associated with the first client electronic device to generate a signed secret; and
sending the signed secret to the second client electronic device.

7. The method of claim 6, further comprising:
by the second client electronic device:
receiving the signed secret,
obtaining the first secret from the signed secret using a public key associated with the first client electronic device,
determining whether data received by the second electronic device from the service provider matches the first secret, and
in response to determining that the data received by the second electronic device from the service provider matches the first secret, causing an alert to be provided to the second user via the second client electronic device.

8. The method of claim 1, further comprising:
by the second client electronic device:
receiving the first secret,
determining whether data received by the second electronic device from the service provider matches the first secret, and
in response to determining that the data received by the second electronic device from the service provider matches the first secret, causing an alert to be provided to the second user via the second client electronic device.

9. A system for verifying an identity of a user, the system comprising:
a first client electronic device associated with a first user; and
a computer-readable storage medium comprising one or more programming instructions that, when executed, cause the first client electronic device to:
receive, from a provider electronic device, a first secret and a second secret, wherein the provider electronic device is associated with a service provider that has matched the first user and a second user for an interaction,
detect, by a receiver of the first client electronic device, a wireless signal being broadcast by a second client electronic device in proximity to a specified physical location where the interaction is to occur, wherein the second client electronic device is associated with the second user,
establish a communication channel with the second client electronic device,
send the first secret to the second client electronic device via the communication channel,
receive data from the second client electronic device via the communication channel,
determine whether the received data matches the second secret, and
in response to determining that the received data matches the second secret, cause an alert to be provided to the first user via the first client electronic device.

10. The system of claim 9, wherein the computer-readable storage medium further comprises one or more programming instructions that, when executed, cause the first client electronic device to:
identify a received signal strength indicator included in the wireless signal; and
determine whether the second client electronic device is within a threshold distance from the first client electronic device,
wherein the one or more programming instructions that, when executed, cause the first client electronic device to establish the communication channel with the second client electronic device comprise one or more programming instructions that, when executed, cause the first client electronic device to establish the communication channel with the second client electronic device in response to determining that the second client electronic device is within the threshold distance.

11. The system of claim 9, wherein the one or more programming instructions that, when executed, cause the first client electronic device to detect the wireless signal being broadcast by the second client electronic device comprise one or more programming instructions that, when executed, cause the first client electronic device to:
receive input from the first user; and
in response to receiving input from the first user, cause the receiver to listen for the wireless signal.

12. The system of claim 9, wherein the one or more programming instructions that, when executed, cause the first client electronic device to detect the wireless signal being broadcast by the second client electronic device comprise one or more programming instructions that, when executed, cause the first client electronic device to:
receive, from the provider electronic device, a notification that the second user is in proximity to the specified physical location; and
in response to receiving the notification, cause the receiver to listen for the wireless signal.

13. The system of claim 9, wherein the one or more programming instructions that, when executed, cause the first client electronic device to receive data from the second client electronic device via the communication channel comprise one or more programming instructions that, when executed, cause the first client electronic device to receive signed data, and obtain the received data from the received signed data using a public key associated with the second client electronic device.

14. The system of claim 9, wherein the computer-readable storage medium further comprises one or more programming instructions that, when executed, causes the first client electronic device to:
sign the first secret using a private key associated with the first client electronic device to generate a signed secret; and
send the signed secret to the second client electronic device.

15. The system of claim 14, further comprising:
a second computer-readable storage medium comprising one or more programming instructions that, when executed, cause the second client electronic device to:
receive the signed secret,
obtain the first secret from the signed secret using a public key associated with the first client electronic device,
determine whether data received by the second client electronic device from the service provider matches the first secret, and
in response to determining that the data received by the second client electronic device from the service provider matches the first secret, cause an alert to be provided to the second user via the second client electronic device.

16. The system of claim 9, further comprising a second computer-readable storage medium comprising one or more programming instructions that, when executed, cause the second client electronic device to:
  receive the first secret,
  determine whether data received by the second client electronic device from the service provider matches the first secret, and
  in response to determining that the data received by the second client electronic device from the service provider matches the first secret, cause an alert to be provided to the second user via the second client electronic device.

* * * * *